Figure 1:
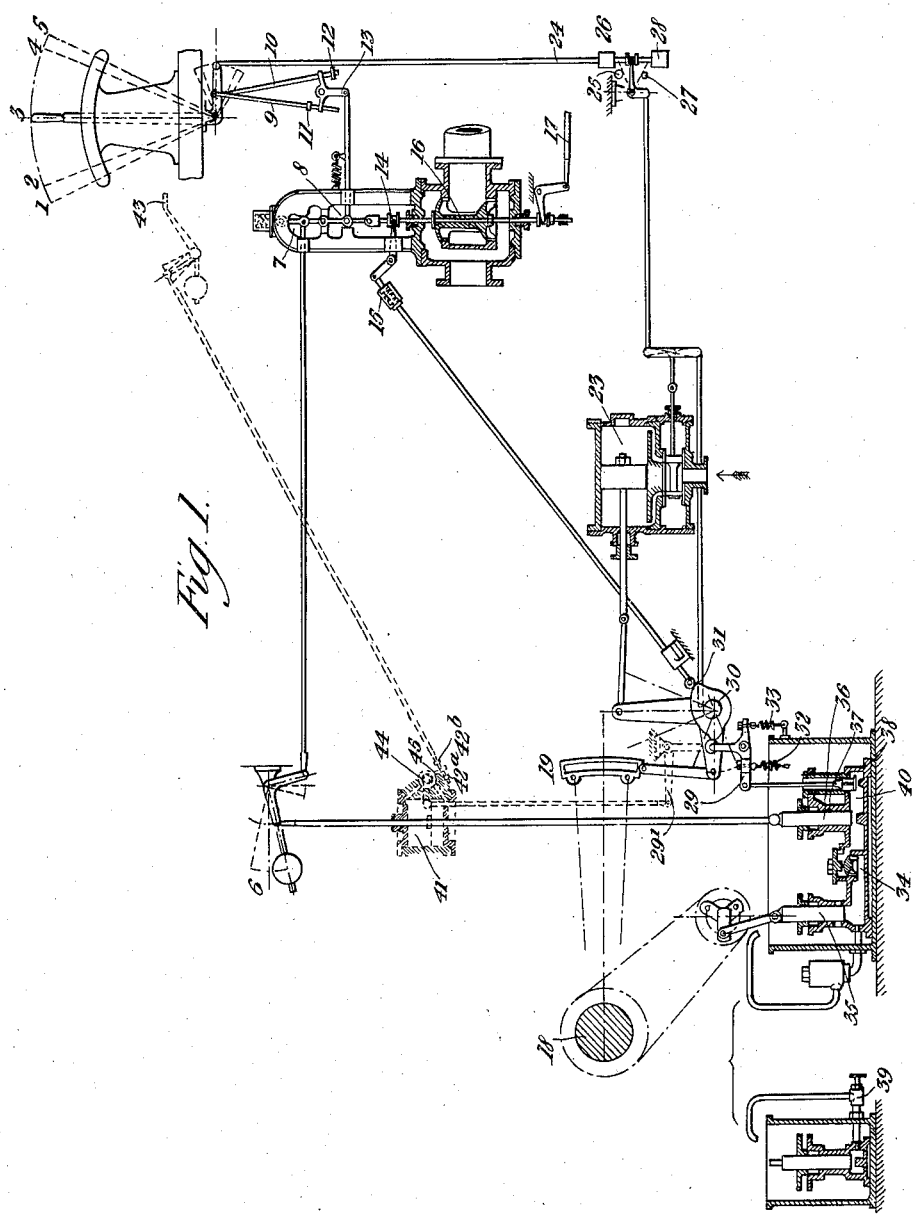

H. PILLING.
CONTROLLING GEAR FOR STEAM OR OTHER FLUID ENGINES.
APPLICATION FILED JAN. 30, 1912.

1,047,836.

Patented Dec. 17, 1912.

2 SHEETS—SHEET 1.

Witnesses:

Inventor
Henry Pilling
by

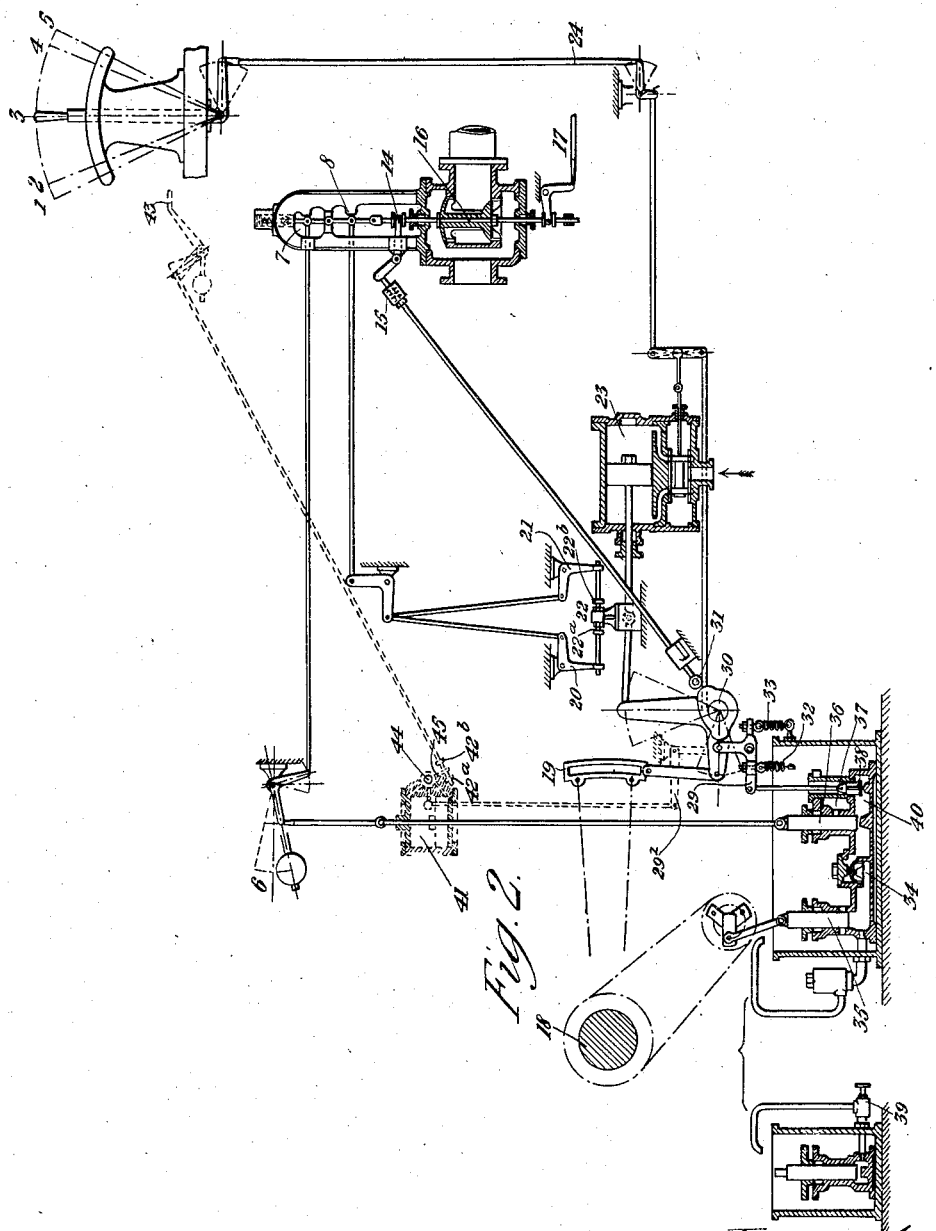

UNITED STATES PATENT OFFICE.

HENRY PILLING, OF LANCASTER, ENGLAND.

CONTROLLING-GEAR FOR STEAM OR OTHER FLUID ENGINES.

1,047,836.  Specification of Letters Patent. Patented Dec. 17, 1912.

Application filed January 30, 1912. Serial No. 674,359.

*To all whom it may concern:*

Be it known that I, HENRY PILLING, a subject of the King of Great Britain, residing in Lancaster, England, and whose post-office address is "Glenderwyn," Manchester Road, Chorlton-cum-Hardy, in the county of Lancaster, England, engineer, have invented certain new and useful Improvements in Controlling-Gear for Steam or other Fluid Engines, of which the following is a specification.

This invention relates to gear whereby the speed and torque of steam and other fluid engines, and particularly such as are necessarily subject to frequent or rapid fluctuations of load, can be regulated by such control of the steam supply and the variable expansion gear as will insure that the engine will be worked at all times with improved steam economy and at the same time will afford complete control of speed and torque.

According to the present invention the steam throttle valve or valves and the reversing or expansion gear in such engines are so correlated that it is possible to run the engine slowly with throttled steam and late cut-off, to insure maximum torque whenever desired, to control in general by the expansion gear instead of by the throttle, and in particular, to insure that the intermediate points of cut-off of the expansion gear shall be controlled by the attendant without interference with the full open position of the throttle valve, thereby insuring economical expansive working with maximum steam pressure. The means whereby such results are obtained comprise a novel combination of (a) reversing or variable expansion gear of ordinary type; (b) a throttle valve with or without pilot valves and passages for steam, or alternatively a by-pass having a separate and relatively small valve; and (c) a pump and cataract device acting on the main throttle valve, these devices being so arranged that the working of the engine is completely controlled by means of a single controlling lever or, alternatively, in place of (c) a steam or other fluid cylinder or electric motor may be arranged to act on the main throttle valve and in such case a supplementary pedal or supplementary operating handle is provided. Thus, for example, in applying the invention to a reversing rolling mill or winding engine or the like, the engine would be equipped with any ordinary reversing gear actuated by hand or power according to size, working either with fixed lap of the valves, or with variable lap as mid-gear is approached, but the rocking shaft or other moving part of the reversing gear would be provided with levers, cams, or engaging parts, arranged as mid-gear is approached to actuate other levers or fingers in such manner as to reduce or urge the throttle valve or valves to the closed position, and also arranged so that other levers, cams or engaging parts open the throttle valve slightly, or alternatively open the pilot or by-pass valve when the reversing gear is at or near either end of its stroke.

In cases where the manual control is sufficiently powerful and the force of the reversing gear motor-cylinder is not necessary for the purpose, the throttle valve may be slightly opened as soon as the reversing gear has approached or is at the end of its stroke by allowing a part connected to the control lever to come into contact with the throttle valve in such manner as to open it slightly or open the pilot or by-pass valve as above described. In the pump and cataract arrangement, these are so connected to the throttle valve that immediately after the engine starts into slow motion and at such speed as may be predetermined, the throttle valve will be shifted promptly to its fully opened position or thereabout and will remain approximately in that position independently of any subsequent movement or variation of the expansion gear, until the controlling gear is brought to the mid or neutral position, whereupon the cam or lever on the reversing shaft previously referred to will suddenly and completely shut off steam. This pump and cataract device is so arranged that the liquid is pumped into an inclosed chamber under a plunger the rate and amplitude of movement of which depends upon the position and size of the outlet slots, provision being made for the sudden return of the plunger by an outlet under the plunger being opened automatically by the reversing gear when brought into the mid or neutral position.

In the preceding description the use of the words "throttle valve" is to be understood to include all the main throttle valves, whether controlling steam in the main steam inlet pipe or pipes, or in the case of multiple expansion engines from the exhaust pipes or receivers between the cylinders.

Alternatively, if automatic working by means of the aforesaid pump and cataract is not desired, then non-automatic full-bore opening of the throttle valve may be provided by arranging a supplementary pedal or supplementary handle for the attendant and connecting this to a motor which in turn is connected with the throttle valve in such manner that the movement of the pedal or handle causes the full movement of the throttle valve.

Designs of controlling gear arranged in accordance with our invention are shown more or less diagrammatically in the accompanying drawings, in which—

Figure 1 is a sectional elevation of one form of controlling gear, and Fig. 2 is a similar view of a modified form. In both figures an alternative arrangement for opening the throttle valve to full extent is shown in broken lines. Except where otherwise stated, the following description shall be taken to apply to both figures equally.

In the two drawings the crankshaft of the engine is represented by 18; the reversing shaft, which may be hand-controlled or motor controlled, by 30; the reversing motor by 23; the main throttle valve controlling the steam or fluid supply to the engine by 16; supplementary throttle valve connections at 17; pump and cataract device as subsequently described, at 40; main handling lever (to operate the throttle valve and the reversing gear) at 3. Figs. 1 and 2 both show the reversing gear operated by means of a hydraulic motor, but it will be understood that any known form of steam or other fluid or electric motor may be used and for small engines the reversing shaft 30 may be directly connected with the control handle 3 and actuated without the intervention of a motor. The principal difference between the controlling gear shown in the two drawings lies in the method adopted for the initial opening of the throttle valve 16 in order to enable the engine to turn slowly. The parts 41 to 45 shown in dotted lines indicate an alternative arrangement in which the pump and cataract gear 40 is replaced by a motor. The movements of the engine are controlled in the first instance by a single lever which is in neutral or mid position at 3. The trottle valve 16 is then closed, the expansion or link gear is in the neutral position, the toggles 7 and 8 through which the throttle valve is actuated are in their straightened or closed positions, and the engine is stationary or on the point of stopping.

In order to cause the engine to turn with a slow and reasonably uniform motion, the control lever is moved toward the position 2 or the position 4, in accordance with the direction of rotation required. To prevent confusion we will confine our description to a forward movement of the lever toward 2, although a similar description will apply in the case of an opposite movement of the lever. When the lever is in position 2 the latest cut-off will be obtainable with the expansion valve gear of Fig. 1, and rather short of the latest cut-off in the case of the gear shown in Fig. 2, and the throttle valve 16 is caused to open slightly so as to admit only throttled steam to the engine. The manner in which this valve is opened is as follows:—Referring to Fig. 1, attached to the control lever are two rods 9 and 10 having adjustable stops 11 and 12 adapted to engage with the double lever 13. When the control lever is in position 2 the part 12 engages the lever 13 and displaces it so as to pull the toggle 8 to one side and lift the valve 16 slightly from the closed position. In this gear it will be seen that the opening of the valve is effected by manual force, and where greater force is desired the gear shown in Fig. 2 may be used.

Referring to Fig. 2, when the control lever 3 is in position 2 the crosshead 22 of the power motor 23 (which is controlled by the lever 3 through a floating lever arrangement of usual construction) comes into contact through the medium of a (preferably adjustable) stop 22$^a$ with the lever 20, thereby displacing the lever slightly and pulling the toggle 8 on one side so that the throttle valve 16 is opened slightly. Similarly, when the control lever 3 is moved to position 4 the valve 16 is opened slightly by the co-operation of crosshead 22, stop 22$^b$ and lever 21. Under these conditions the engine can move slowly under light load, and the arrangement for securing maximum torque at slow speed is as follows:—

Referring to Fig. 1, when the control lever is in position 2 the power motor 23 operating the reversing shaft 30 is in its farthest outward position, corresponding to "full gear" of the link motion 19 and maximum cut-off. Since the movement of the control lever from position 2 to position 1, (or in the case of reverse rotation from position 4 to position 5) cannot then alter the position of the reversing shaft 30, a stop 25 is placed to limit the motion of the lever controlling the motion of the reversing motor, and a spring cushion 28 is fitted to the driving rod 24 from the control lever 3 to permit of the motion of the latter from position 2 to position 1. This movement of the control lever causes the toggle 8 to open the throttle wider through the rod 10 and lever 13. Alternatively, the stops 25, 27 and the cushion controls 26, 28 may be omitted, but in this case the positions 1 and 2 of the controlling handle would correspond to slightly varying points of cut-off, and similarly with positions 4 and 5.

Referring to Fig. 2, the power motor 23 operating the reversing shaft 30 is a short distance from its farthest outward position when the control lever is in the position 2. The remaining portion of the travel in the motor cylinder is obtained by moving the control lever from position 2 to position 1, and the resulting further movement of the crosshead 22 of the motor cylinder brings the stop 22ᵃ on crosshead 22 into engagement with lever 20 so as to actuate the toggle 8 and open throttle valve 16 in such proportion as may be determined by the amount of movement of handle 3 between the positions 2 and 1. In this manner it is possible to cause the engine to start from rest or to increase its speed from slow turning, even against maximum resistance. The amount the throttle valve is opened, however, under the preceding arrangements, would not be sufficient to maintain full steam pressure in the engine as the latter approaches or attains full speed, and provision is consequently made for finally opening the throttle valve to the maximum extent, such provision being either automatic or non-automatic in its operation.

For automatic working and referring either to Fig. 1 or Fig. 2, a pump 35 of any suitable construction, but preferably having a particularly uniform delivery of fluid, is driven by the engine, and supplies a chamber 40 into which projects the plunger 36. This chamber is provided with an inlet valve 34, and an outlet valve 38 and when the plunger 36 is at the top of its stroke, free outlet slots 37. The outlet valve 38 is connected, by means of the links shown, with the lever 29 the upper end of which is so arranged as to come in contact with a cam on the reversing shaft 30 whenever the latter it at mid or neutral position. The valve 38 is therefore then compulsorily opened. The valve 38, lever 29 and the springs 32, 33 connected therewith are all arranged so that when the engine is at rest the normal position of the valve is open. The springs, which may be replaced by balance weights if desired, can also be regulated so as to give the valve 38 any desired resistance to the closing tendency due to the movement of the pumped liquid past it. When, owing to the engine being in motion, the moving current overcomes the resistance of the springs, the valve 38 is suddenly closed. The confinement of the pump liquid in the chamber 40 then immediately causes the plunger 36 to ascend, thus rapidly opening the throttle valve 16 by means of suitable linkage operating the toggle 7. The upward movement of the plunger 36 ceases as soon as the bottom of the plunger uncovers the free outlet slots 37. The pumped liquid is then received by the containing vessel. The closing of valve 38 may be regulated by the springs 32 and 33, as shown, or alternatively by balance weights, or the action may be assisted or delayed by the use of by-pass valve 39, by means of which an alternative route for the escape of liquid is provided, and consequently a ready means of varying the rate of flow past valve 38, thus enabling the closing of the valve to correspond with any desired speed of revolution of the engine. If now the control lever be brought backward toward the neutral position 3, the plunger 36 will remain in its top position and keep the throttle valve wide open so long as the minimum speed is sufficiently high to maintain an adequate supply of fluid to the chamber 40, such minimum speed being fixed by regulating the by-pass 39. For speeds above this minimum, the movement of the controlling handle affects only the position of the cut-off. By this method of working economical use of steam is insured.

When it is desired to stop the engine, the control lever is brought to the mid or neutral position 3. This causes the reversing motor 23 to bring the reversing shaft 30 into mid gear or neutral position. At the same time a cam on the reversing shaft 30 acting on the roller 31 shifts the lever 14 so as to force the throttle valve 16 to the closed position, although the plunger 36 tends to keep it open. A spring cushion 15 is inserted in the connections between the roller 31 and the valve 16, so that the latter may be forced on to its seat with certainty but without damage to the gear. At the same instant the cam on the reversing shaft 30 which engages with the lever 29, causes the relief valve 38 to be opened so that the fluid escapes from the chamber 40 and the plunger 36 falls to its lowest position. It may be assisted in this by springs or balance weights 6, as well as by the action of the lever 14 straightening out the toggle 7. The controlling lever and the whole valve gear are now in neutral position.

Although only one throttle valve is shown in Figs. 1 and 2, the spindle of this valve can be connected, as by the rod 17, to other throttle valves controlling the steam to any or all of the other cylinders of the engine, high, intermediate, or low pressure, and either on the exhaust or admission side of any cylinder.

For non-automatic working the arrangement of the controlling gear is as follows:— The pump and cataract device 40 is replaced by a motor 41 of known construction actuated by electricity or by fluid under steady pressure. This motor is controlled simply by means of rod 42 and pedal 43 (or alternatively by means of a second hand lever) in such manner that the piston or moving element of the motor can be moved from end to end of its stroke but cannot remain in intermediate positions. The valve 44 can also be actuated by the cam on the reversing shaft 30 engaging one end of lever 29' which is linked with the valve lever 45. In this way the depression of the pedal will cause the piston of the motor cylinder 41 to traverse its full stroke, thus fully opening the throttle valve 16, in which position the valve will remain until the foot pedal is allowed to rise, when one of the adjustable stops 42<sup>a</sup>, 42<sup>b</sup> on the end of the rod 42 will move lever 45, so as to cause the piston of the motor cylinder to descend and close the throttle valve 16.

In the event of the attendant not allowing pedal 43 to rise when the main controlling handle 3 is moved to mid position in order to stop the engine, the movement of the reversing shaft to mid position and the action of lever 29' on lever 45, will also close the throttle valve owing to the force of the reversing shaft cam overcoming any foot pressure the attendant may be exerting on foot pedal 43. And, finally, the valve 16 will be pressed on its seat by the roller 31 being in contact with the cam on the reversing shaft 30.

I claim:—

1. In elastic fluid rolling mill engines, winding engines or the like, the combination of a valved inlet for supply of motive fluid to the working cylinder, a reversing or expansion gear, a controlling lever and setting gear correlated with the valvular part of the fluid supply inlet and the expansion gear and operable by said lever, said setting gear adapted, when the lever is moved in either direction from its mid or neutral position, to set the expansion gear to a position of late cut off and subsequently to open partially the said fluid supply inlet so that the engine is supplied with a throttled supply of motive fluid and means for controlling the fluid supply inlet independently of the expansion gear after the latter has been shifted to the latest cut off.

2. In elastic fluid rolling mill engines, winding engines or the like, the combination of a main motive fluid supply throttle valve, a supplementary throttle valve, a reversing or expansion gear, a controlling lever, and setting gear correlated with the main and supplementary throttle valves and the expansion gear and operable by the said lever, said setting gear adapted, when the lever is moved in either direction from its mid or neutral position, to set the expansion gear to a position of late cut off and subsequently to open partially the said throttle valves so that the engine is supplied with a throttled supply of motive fluid and means for controlling the fluid supply inlet independently of the expansion gear after the latter has been shifted to the latest cut off.

3. In elastic fluid rolling mill engines, winding engines or the like, the combination of a valved inlet for supply of motive fluid to the working cylinder, a reversing or expansion gear, a controlling lever and setting gear correlated with the valvular part of the fluid supply inlet and the expansion gear and operable by said lever, said setting gear being adapted when operated and during the first portion of its movement in either direction from its mid or neutral position to set the expansion gear to a position of late cut off and subsequently to open partially the said fluid supply inlet so that the engine is supplied with a throttled supply of motive fluid, and means operating during the last portion of the movement of the setting gear from the neutral position, to open the said fluid supply inlet to a further extent without affecting the expansion gear.

4. In elastic fluid rolling mill engines, winding engines or the like, the combination of a main motive fluid supply throttle valve, a supplementary throttle valve, a reversing or expansion gear, a controlling lever, and setting gear correlated with the main and supplementary throttle valves and the expansion gear and operable by the said lever, said setting gear being adapted when operated and during the first portion of its movement in either direction from its mid or neutral position to set the expansion gear to a position of late cut off and subsequently to open partially the said throttle valves so that the engine is supplied with a throttled supply of motive fluid, and means operating during the last portion of the movement of the setting gear from the neutral position, to open the main and supplementary throttle valves to a further extent without affecting the expansion gear.

5. In elastic fluid rolling mill engines, winding engines or the like, the combination of a valved inlet for supply of motive fluid to the working cylinder, a reversing or expansion gear, a controlling lever, setting gear correlated with the valvular part of the fluid supply inlet and the expansion gear and operable by said lever, said setting gear adapted when the lever is moved in either direction from its mid or neutral position, to set the expansion gear to a position of late cut off and subsequently to open partially the said fluid supply inlet so that the engine is supplied with a throttled supply of motive fluid, and a supplemental device operating independently of the setting gear to open the said fluid supply inlet fully.

6. In elastic fluid rolling mill engines, winding engines or the like, the combination of a valved inlet for supply of motive fluid to the working cylinder, a reversing or expansion gear, a controlling lever, setting gear correlated with the valvular part of the fluid supply inlet and the expansion gear and operable by said lever, said setting gear adapted when the lever is moved in either direction from its mid or neutral position, to set the expansion gear to a position of late cut off and subsequently to open partially the said fluid supply inlet so that the engine is supplied with a throttled supply of motive fluid, and a supplemental device operating independently of the setting gear to open the said fluid supply inlet fully, said device comprising mechanism correlated with the valvular part of the fluid supply inlet, an independent motor operatively connected with the mechanism and a supplementary controlling member for controlling the motor.

7. In elastic fluid rolling mill engines, winding engines or the like, the combination of a valved inlet for supply of motive fluid to the working cylinder, a reversing or expansion gear, a controlling lever, setting gear correlated with the valvular part of the fluid supply inlet and the expansion gear and operable by said lever, said setting gear adapted when the lever is moved in either direction from its mid or neutral position, to set the expansion gear to a position of late cut off and subsequently to open partially the said fluid inlet so that the engine is supplied with a throttled supply of motive fluid, a supplemental device operating independently of the setting gear to open the said fluid supply inlet fully, and means whereby the supplemental device comes automatically into operation after the engine has started into slow motion and attained a predetermined speed.

8. In elastic fluid rolling mill engines, winding engines or the like, the combination of a valved inlet for supply of motive fluid to the working cylinder, a reversing or expansion gear, a controlling lever, setting gear correlated with the valvular part of the fluid supply inlet and the expansion gear and operable by said lever, said setting gear adapted when the lever is moved in either direction from its mid or neutral position, to set the expansion gear to a position of late cut off, and subsequently to open partially the said fluid inlet so that the engine is supplied with a throttled supply of motive fluid, a supplemental device operating independently of the setting gear to open the said fluid supply inlet fully, and means whereby the supplemental device comes automatically into operation after the engine has started into slow motion and attained a predetermined speed, said means comprising a pump operated by the engine and a cataract device associated with said pump.

9. In elastic fluid rolling mill engines, winding engines or the like, the combination of a main motive fluid supply throttle valve, a supplementary throttle valve, a reversing or expansion gear, a controlling lever, setting gear correlated with the main and supplementary throttle valves and the expansion gear and operable by the said lever, said setting gear adapted, when the lever is moved in either direction from its mid or neutral position, to set the expansion gear to a position of late cut off and subsequently to open partially the said throttle valves so that the engine is supplied with a throttled supply of motive fluid and a supplemental device operating independently of the setting gear to open the said throttle valves fully.

10. In elastic fluid rolling mill engines, winding engines or the like, the combination of a main motive fluid supply throttle valve, a supplementary throttle valve, a reversing or expansion gear, a controlling lever, setting gear correlated with the main and supplementary throttle valves and the expansion gear and operable by the said lever, said setting gear adapted, when the lever is moved in either direction from its mid or neutral position, to set the expansion gear to a position of late cut off and subsequently to open partially the said throttle valves so that the engine is supplied with a throttled supply of motive fluid and a supplemental device operating independently of the setting gear to open the said throttle valves fully, said device comprising mechanism correlated with the said throttle valves, an independent motor operatively connected with the mechanism and a supplementary controlling member for controlling the motor.

11. In elastic fluid rolling mill engines, winding engines or the like, the combination of a main motive fluid supply throttle valve, a supplementary throttle valve, a reversing or expansion gear, a controlling lever, setting gear correlated with the main and supplementary throttle valves and the expansion gear and operable by the said lever, said setting gear adapted, when the lever is moved in either direction from its mid or neutral position, to set the expansion gear to a position of late cut off and subsequently to open partially the said throttle valves so that the engine is supplied with a throttled supply of motive fluid, a supplemental device operating independently of the setting gear to open the said throttle valves fully, and means whereby the supplemental device comes automatically into operation after the engine has started into slow motion and attained a predetermined speed.

12. In elastic fluid rolling mill engines, winding engines or the like, the combination of a main motive fluid supply throttle valve, a supplementary throttle valve, a reversing or expansion gear, a controlling lever, setting gear correlated with the main and supplementary throttle valves and the expansion gear and operable by the said lever, said setting gear adapted, when the lever is moved in either direction from its mid or neutral position, to set the expansion gear to a position of late cut off and subsequently to open partially the said throttle valves so that the engine is supplied with a throttled supply of motive fluid, a supplemental device operating independently of the setting gear to open the said throttle valves fully, and means whereby the supplemental device comes automatically into operation after the engine has started into slow motion and attained a predetermined speed, said means comprising a pump operated by the engine and a cataract device associated with said pump.

13. In elastic fluid rolling mill engines, winding engines or the like, the combination of a valved inlet for supply of motive fluid to the working cylinder, a reversing or expansion gear, a controlling lever, setting gear correlated with the valvular part of the fluid supply inlet and the expansion gear and operable by said lever, said setting gear adapted, when the lever is moved in either direction from its mid or neutral position, to set the expansion gear to a position of late cut off and subsequently to open partially the said fluid supply inlet so that the engine is supplied with a throttled supply of motive fluid, means for controlling the fluid supply inlet independently of the expansion gear after the latter has been shifted to the latest cut off, and means correlated with the expansion gear operating to force said valvular part into the closed position to cut off the motive fluid supply when the controlling lever together with the expansion gear is brought to a mid or neutral position.

14. In elastic fluid rolling mill engines, winding engines or the like, the combination of a main motive fluid supply throttle valve, a supplementary throttle valve, a reversing or expansion gear, a controlling lever, setting gear correlated with the main and supplementary throttle valves and the expansion gear and operable by the said lever, said setting gear adapted, when the lever is moved in either direction from its mid or neutral position, to set the expansion gear to a position of late cut off and subsequently to open partially the said throttle valves so that the engine is supplied with a throttled supply of motive fluid, means for controlling the fluid supply inlet independently of the expansion gear after the latter has been shifted to the latest cut off, and means correlated with the expansion gear operating to force the said valves into closed positions to cut off the motive fluid supply when the controlling lever together with the expansion gear is brought to a mid or neutral position.

15. In elastic fluid rolling mill engines, winding engines or the like, the combination of a valved inlet for supply of motive fluid to the working cylinder, a reversing or expansion gear, a controlling lever, setting gear correlated with the valvular part of the fluid supply inlet and the expansion gear and operable by said lever, said setting gear being adapted, when operated and during the first portion of its movement in either direction from its mid or neutral position, to set the expansion gear to a position of late cut off and subsequently to open partially the said fluid supply inlet so that the engine is supplied with a throttled supply of motive fluid, and means operating during the last portion of the movement of the setting gear from the neutral position, to open the said fluid supply inlet to a further extent without affecting the expansion gear, and means correlated with the expansion gear operating to force said valvular part into the closed position to cut off the motive fluid supply when the controlling lever together with the expansion gear is brought to a mid or neutral position.

16. In elastic fluid rolling mill engines, winding engines or the like, the combination of a main motive fluid supply throttle valve, a supplementary throttle valve, a reversing or expansion gear, a controlling lever, setting gear correlated with the main and supplementary throttle valves and the expansion gear and operable by the said lever, said setting gear being adapted, when operated and during the first portion of its movement in either direction from its mid or neutral position, to set the expansion gear to a position of late cut off and subsequently to open partially the said throttle valves so that the engine is supplied with a throttled supply of motive fluid, and means operating during the last portion of the movement of the setting gear from the neutral position, to open the main and supplementary throttle valves to a further extent without affecting the expansion gear, and means correlated with the expansion gear operating to force the said valves into closed positions to cut off the motive fluid supply when the controlling lever together with the expansion gear is brought to a mid or neutral position.

17. In elastic fluid rolling mill engines, winding engines or the like, the combination of a valved inlet for supply of motive fluid to the working cylinder, a reversing or expansion gear, a controlling lever, setting gear correlated with the valvular part of the fluid supply inlet and the expansion gear and operable by said lever, said setting gear adapted when the lever is moved in either direction from its mid or neutral position to set the expansion gear to a position of late cut off and subsequently to open partially the said fluid supply inlet so that the engine is supplied with a throttled supply of motive fluid, a supplemental device operating independently of the setting gear to open the said fluid supply inlet fully, and means correlated with the expansion gear operating to force said valvular part into the closed position to cut off the motive fluid supply when the controlling lever together with the expansion gear is brought to a mid or neutral position.

18. In elastic fluid rolling mill engines, winding engines or the like, the combination of a valved inlet for supply of motive fluid to the working cylinder, a reversing or expansion gear, a controlling lever, setting gear correlated with the valvular part of the fluid supply inlet and the expansion gear and operable by said lever, said setting gear adapted when the lever is moved in either direction from its mid or neutral position, to set the expansion gear to a position of late cut off and subsequently to open partially the said fluid supply inlet so that the engine is supplied with a throttled supply of motive fluid, a supplemental device operating independently of the setting gear to open the said fluid supply inlet fully, said device comprising mechanism correlated with the valvular part of the fluid supply inlet, an independent motor operatively connected with the mechanism and a supplementary controlling member for controlling the motor, and means correlated with the expansion gear operating to force said valvular part into the closed position to cut off the motive fluid supply when the controlling lever together with the expansion gear is brought to a mid or neutral position.

19. In elastic fluid rolling mill engines, winding engines or the like, the combination of a valved inlet for supply of motive fluid to the working cylinder, a reversing or expansion gear, a controlling lever, setting gear correlated with the valvular part of the fluid supply inlet and the expansion gear and operable by said lever, said setting gear adapted when the lever is moved in either direction from its mid or neutral position to set the expansion gear to a position of late cut off and subsequently to open partially the said fluid inlet so that the engine is supplied with a throttled supply of motive fluid, a supplemental device operating independently of the setting gear to open the said fluid supply inlet fully, means whereby the supplemental device comes automatically into operation after the engine has started into slow motion and attained a predetermined speed, and means correlated with the expansion gear operating to force said valvular part into the closed position to cut off the motive fluid supply when the controlling lever together with the expansion gear is brought to a mid or neutral position.

20. In elastic fluid rolling mill engines, winding engines or the like, the combination of a valved inlet for supply of motive fluid to the working cylinder, a reversing or expansion gear, a controlling lever, setting gear correlated with the valvular part of the fluid supply inlet and the expansion gear and operable by said lever, said setting gear adapted, when the lever is moved in either direction from its mid or neutral position, to set the expansion gear to a position of late cut off, and subsequently to open partially the said fluid inlet so that the engine is supplied with a throttled supply of motive fluid, a supplemental device operating independently of the setting gear to open the said fluid supply inlet fully, means whereby the supplemental device comes automatically into operation after the engine has started into slow motion and attained a predetermined speed, said means comprising a pump operated by the engine and a cataract device associated with said pump, and means correlated with the expansion gear operating to force said valvular part into the closed position to cut off the motive fluid supply when the controlling lever together with the expansion gear is brought to a mid or neutral position.

21. In elastic fluid rolling mill engines, winding engines or the like, the combination of a main motive fluid supply throttle valve, a supplementary throttle valve, a reversing or expansion gear, a controlling lever, setting gear correlated with the main and supplementary throttle valves and the expansion gear and operable by the said lever, said setting gear adapted, when the lever is moved in either direction from its mid or neutral position, to set the expansion gear to a position of late cut off and subsequently to open partially the said throttle valves so that the engine is supplied with a throttled supply of motive fluid, a supplemental device operating independently of the setting gear to open the said throttle valves fully, and means correlated with the expansion gear operating to force the said valves into closed positions to cut off the motive fluid supply when the controlling lever together with the expansion gear is brought to a mid or neutral position.

22. In elastic fluid rolling mill engines, winding engines or the like, the combination of a main motive fluid supply throttle valve, a supplementary throttle valve, a reversing or expansion gear, a controlling lever, setting gear correlated with the main and supplementary throttle valves and the expansion gear and operable by the said lever, said setting gear adapted, when the lever is moved in either direction from its mid or neutral position, to set the expansion gear to a position of late cut off and subsequently to open partially the said throttle valves so that the engine is supplied with a throttled supply of motive fluid and a supplemental device operating independently of the setting gear to open the said throttle valves fully, said device comprising mechanism correlated with the said throttle valves, an independent motor operatively connected with the mechanism, a supplementary controlling member for controlling the motor, and means correlated with the expansion gear operating to force the said valves into closed positions to cut off the motive fluid supply when the controlling lever together with the expansion gear is brought to a mid or neutral position.

23. In elastic fluid rolling mill engines, winding engines or the like, the combination of a main motive fluid supply throttle valve, a supplementary throttle valve, a reversing or expansion gear, a controlling lever, setting gear correlated with the main and supplementary throttle valves and the expansion gear and operable by the said lever, said setting gear adapted, when the lever is moved in either direction from its mid or neutral position, to set the expansion gear to a position of late cut off and subsequently to open partially the said throttle valves so that the engine is supplied with a throttled supply of motive fluid, a supplemental device operating independently of the setting gear to open the said throttle valves fully, means whereby the supplemental device comes automatically into operation after the engine has started into slow motion and attained a predetermined speed, and means correlated with the expansion gear operating to force the said valves into closed positions to cut off the motive fluid supply when the controlling lever together with the expansion gear is brought to a mid or neutral position.

24. In elastic fluid rolling mill engines, winding engines or the like, the combination of a main motive fluid supply throttle valve, a supplementary throttle valve, a reversing or expansion gear, a controlling lever, setting gear correlated with the main and supplementary throttle valves and the expansion gear and operable by the said lever, said setting gear adapted, when the lever is moved in either direction from its mid or neutral position, to set the expansion gear to a position of late cut off and subsequently to open partially the said throttle valves so that the engine is supplied with a throttled supply of motive fluid, a supplemental device operating independently of the setting gear to open the said throttle valves fully, means whereby the supplemental device comes automatically into operation after the engine has started into slow motion and attained a predetermined speed, said means comprising a pump operated by the engine and a cataract device associated with said pump, and means correlated with the expansion gear operating to force the said valves into closed positions to cut off the motive fluid supply when the controlling lever together with the expansion gear is brought to a mid or neutral position.

In testimony whereof I have signed my name to this specification in the presence of two subscribing witnesses.

HENRY PILLING.

Witnesses:
  WILLIAM ROUSE,
  ERNALD SIMPSON MOSELEY.